United States Patent [19]

Heidenhain et al.

[11] Patent Number: 4,863,536
[45] Date of Patent: Sep. 5, 1989

[54] METHOD OF ENCAPSULATING AN ELECTRICAL COMPONENTS

[75] Inventors: Frank Heidenhain, Munich; Christian F. Kemp, Regensburg, both of Fed. Rep. of Germany

[73] Assignee: Raychem GmbH, Fed. Rep. of Germany

[21] Appl. No.: 171,214

[22] Filed: Mar. 18, 1988

Related U.S. Application Data

[63] Continuation of Ser. No. 865,707, May 21, 1986, abandoned.

[30] Foreign Application Priority Data

May 22, 1985 [GB] United Kingdom ............... 8513006

[51] Int. Cl.$^4$ .................. B29C 61/02; B29C 63/42; B32B 31/26
[52] U.S. Cl. ............................ 156/56; 156/53; 156/55; 156/85; 156/86; 156/275.5; 156/307.1; 264/22; 264/230; 264/263; 264/272.13; 264/342 R; 264/DIG. 71; 264/DIG. 76
[58] Field of Search ............ 264/22, 25, 36, 173, 264/209.4, 211.12, 230, 263, 272.13, 342 R, DIG. 71, DIG. 76; 156/49, 51, 52, 53, 54, 55, 56, 84, 85, 86, 94, 163, 244.13, 244.24, 272.2, 273.3, 275.5, 307.1

[56] References Cited

U.S. PATENT DOCUMENTS

| | | | |
|---|---|---|---|
| 2,027,962 | 1/1936 | Currie | 264/230 |
| 3,086,242 | 4/1963 | Cook et al. | 264/230 X |
| 3,421,501 | 1/1969 | Beightol | 264/22 X |
| 3,597,372 | 8/1971 | Cook | 264/230 X |
| 3,669,824 | 6/1972 | Hess | 264/230 X |
| 3,725,230 | 4/1973 | Bahder et al. | 264/22 X |
| 3,899,807 | 8/1975 | Sovish et al. | 264/22 X |
| 3,988,399 | 10/1976 | Evans | 264/22 |
| 4,041,237 | 8/1977 | Stine et al. | 264/22 X |
| 4,101,699 | 7/1978 | Stine et al. | 264/22 X |
| 4,230,649 | 10/1980 | Bohm et al. | 156/273.5 X |
| 4,236,949 | 12/1980 | Horsma et al. | 156/49 |
| 4,239,077 | 12/1980 | Dixon et al. | 156/273.5 |
| 4,366,201 | 12/1982 | Changani et al. | 264/230 X |
| 4,450,318 | 5/1984 | Scardina et al. | 156/56 X |
| 4,497,760 | 2/1985 | Sorlien | 264/36 |
| 4,610,746 | 9/1986 | Broer et al. | 156/275.5 |
| 4,761,193 | 8/1988 | Pithouse et al. | 156/85 |
| 4,761,194 | 8/1988 | Pithouse et al. | 156/86 |

FOREIGN PATENT DOCUMENTS

| | | | |
|---|---|---|---|
| 196219 | 10/1986 | European Pat. Off. | |
| 2320273 | 11/1974 | Fed. Rep. of Germany | 156/86 |
| 2944922 | 5/1981 | Fed. Rep. of Germany | |
| 2535526 | 4/1984 | France | |
| 52-39779 | 3/1977 | Japan | 264/230 |
| 57-22208 | 5/1982 | Japan | 264/25 |
| 57-188322 | 11/1982 | Japan | 264/25 |
| 59-45117 | 3/1984 | Japan | 264/230 |
| 59-69905 | 4/1984 | Japan | 264/22 |
| 59-70508 | 4/1984 | Japan | |
| 1245937 | 9/1971 | United Kingdom | |
| 1335123 | 10/1973 | United Kingdom | |
| 1379279 | 1/1975 | United Kingdom | |
| 1440524 | 6/1976 | United Kingdom | |
| 2065552 | 7/1981 | United Kingdom | 156/52 |
| 2095921 | 10/1982 | United Kingdom | 264/230 |
| 2126804 | 3/1984 | United Kingdom | 156/86 |

Primary Examiner—Jeffery Thurlow
Assistant Examiner—Leo B. Tentoni
Attorney, Agent, or Firm—Edith A. Rice; Herbert G. Burkard

[57] ABSTRACT

An electrical component, such as a joint between bus bars, is insulated by wrapping therearound a sheet of gel-like material, and manually causing it to conform to the joint. The material is curable by ultra-violet radiation, and this is directed on to the wrapped sheet to cause it to harden. A recoverable tube may be mounted over the sheet, before or after curing, to provide additional protection.

10 Claims, 1 Drawing Sheet

METHOD OF ENCAPSULATING AN ELECTRICAL COMPONENTS

This application is a continuation of application Ser. No. 865,707, filed May 21, 1986, now abandoned.

BACKGROUND OF THE INVENTION

This invention relates to a method of encapsulating an electrical component.

An electrical component, and in particular an elongate component such as an electrical conductor, including a bus bar, and connections, or joints, therebetween, may be encapsulated, for electrical insulation and/or sealing purposes for example, in several different ways. Heat recoverable polymeric sleeves, in tubular or wrap-around configuration and optionally having an adhesive or mastic inner coating, are now well known and widely accepted for this purpose, and offer significant advantages over other methods in a large number of applications. Insulating by means of a push-on arrangement, whilst not requiring any heat source, is restricted, for any given sleeve, to a substrate of a size within a very small range of values if adequate sealing thereto is to be achieved. Insulating by tape wrapping does overcome the last-mentioned difficulty, but care has to be taken to ensure complete covering of the substrate and thus adequate protection. However, it is known to apply around a cable joint a tape that has, immediately prior to wrapping on to the substrate, been coated with a mixed two part curing resin. The resin is arranged to flow over the whole of at least the outermost surface of the wrapped tape, thus filling any gaps, but this can be messy and thus unpleasant and awkward to handle. Furthermore, wrapping a narrow tape, possibly in more than one layer, around a substrate, can be very time consuming.

However, there are instances where encapsulation is required in which it may be impossible or inconvenient to use sleeves that are recoverable by heat or by any other means, and in which tape wrapping as described above may not be convenient.

Examples of such instances are a hazardous area, where a flame cannot be used, an area where flammable material is in close proximity, or a confined area, where access is not conveniently available all around the substrate to be encapsulated, and where the component to be encapsulated is of inconveniently irregular shape. It may be possible in such instances to encase the component within two interlocking half shells that are subsequently filled with a hot pourable material that solidifies and cures on cooling, but this itself is inconvenient and bulky, and does not give good control of the encapsulant thickness, for example for insulation purposes. Furthermore, up to twenty four hours, or even longer, may have to be allowed for the liquid encapsulant to cure fully before the enclosed electrical component may be made fully operational.

It is an object of the present invention to provide a method of encapsulating an electrical component or other substrate that overcomes, or at least alleviates, at least some of the above-mentioned disadvantages.

SUMMARY OF THE INVENTION

In accordance with one aspect of the present invention there is provided a method of encapsulating an electrical component, wherein material that is curable by ultra-violet radiation is disposed around the component so as substantially to conform therewith, and ultra-violet radiation is directed on to the material so as to effect curing thereof.

Although substantially complete curing, that is to say curing throughout the thickness, of the material, which may be in sheet form, is desirable, it is envisaged that this may not take place in practice. The curing time and degree of curing are dependent on the composition of the curable material, including the relationship between the response of the photoinitiator component of the composition and the wavelength output characteristic of the source of ultra-violet (UV) radiation, the power output, and thus intensity of the radiation source, the thickness of the material used, as well as the geometrical configuration of, and ease of access to, the sheet when placed around the component. In the latter respect, a radiation reflector may advantageously be employed in some instances to ensure exposure of the whole of the sheet to the radiation.

The cured material may be electrically insulating, and then may advantageously also be substantially electrically non-tracking, for example in accordance with the ASTM D 2303 Inclined Plane Tracking Test.

The thickness of the material required to cover the component will depend on the requirements of the encapsulation, such as the voltage to be withstood where encapsulation is required for electrical insulation purposes, or the load to be withstood under an impact test where encapsulation is required to provide mechanical protection. Furthermore, the material thickness may also be chosen in dependence on the mechanical load expected to be exerted on the electrical component resulting from any electrical faults, such as a high fault current, that may affect the component in service.

Preferably, the parameters referred to above are arranged to provide a curing time of between about 1 minute and 10 minutes, and most preferably of about 3 minutes to 5 minutes.

The sheet used in the method of the present invention advantageously is thick enough such that one layer around the component is sufficient to provide all the protection, e.g. insulation, that is required. It will be appreciated that some overlap between the ends of the sheet may be necessary to provide complete encapsulation. The encapsulation may then conveniently be provided by taking a flat sheet of the curable material, folding it into a U-shape around the component, pressing it, for example manually, into conformity with the component, and subjecting it to the ultra-violet radiation. In some applications, a greater degree of overlap of the curable material, for example to provide two, or more, complete layers, may be desirable or necessary.

The sheet may be partially or wholly pre-shaped to conform to the component.

The sheet will usually be subjected to the ultra-violet radiation after installation on the component, but it may be at least partially irradiated just before such installation, for example to reduce, its surface tackiness. This latter feature is particularly useful when the curable material is in the form of an elongate tape rather than a sheet.

Preferably the curable material used in the method of the invention comprises a compound of a polymeric material, an acrylate or methacrylate monomer, oligomer or prepolymer, or a mixture thereof, and a photoinitiator that is responsive to ultra-violet radiation. Advantageously, the polymeric material is selected from polyacrylate homo or co-polymer, polymethacrylate homo or co-polymer, for example Plexigum P-24 (from Roehm) or Elvacite 2044 (from Du Pont), ethylene-vinylacetate co-polymer, preferably with a vinyl acetate content above about 45% by weight of the total weight of the composition, for example Escorene MP02020, chlorinated polyethylene, for example Bayer CM 3614, chlorosulphonated polyethylene, for example Hypalon 20 (from Du Pont), and ethylene-methylacrylate-organic acid terpolymer, for example Vamac N 123 (from Du Pont).

The acrylate or methacrylate monomer, oligomer, or prepolymer is preferably bi-functional, with a chain length of at least 6 carbon or carbon and oxygen atoms, for example Chemlink 2000 (from ARCO Chemical). Combinations of bifunctional and monofunctional acrylates may be used if the cured material is required to have enhanced flexibilty. The material is chosen to counteract the inherent inflexibility of the chosen polymeric material, so that the required degree of flexibility and lack of brittleness is achieved in the curable state of the material.

The polymeric material is required to dissolve in the acrylate or methylacrylate material, and for this the polymer preferably is in powdered form. Polymeric material that is conventionally available only in pellet form may be ground, for example using a cryogenic grinder, to a powder of suitable particle size, for example between 100 microns and 800 microns.

The curable material also comprises a photoinitiator that is responsive to ultra-violet radiation, preferably a hydroxyalkylbenzophenone material, for example Darocur 953 (from E Merck). Other suitable photoinitiators are benzoin ethers, alkylphenones, benzophenones, xanthones, thioxanthones, and their derivatives.

The curable material may also comprise a plasticiser for enhancing processing of the material and providing desired characteristics. Preferably, the plasticiser is a reactive material that can be built into the matrix of the polymeric material. A suitable material is an acrylated epoxidised soybean oil such as Photomer 3005 (available from Diamond Shamrock).

The curable material may also contain other additives in minor amounts, usually less than 10% by weight of the total weight of the composition, of antioxidents, stabilizers and fillers for example.

Preferably, the polymeric material comprises between 30% and 70%, the acrylate or methacrylate between 10% and 40%, the photoinitiator between 1% and 5%, and the plasticiser between 0% and 20%, by weight of the total weight of the curable composition.

The components are advantageously mixed together under vacuum, thus avoiding the inclusion of air bubbles that would otherwise be detrimental to use of the material to encapsulate high voltage electrical components for electrically insulating purposes. The resulting liquid material may then be poured into a mould, such as a horizontal tray, protected by release paper, to a depth dependent on the required sheet thickness. The material is then left, protected from ultra-violet radiation to undergo a large viscosity change to a gel-like consistency, having a viscosity at 80° C. greater than about $1.5 \times 10^3$ Pa-sec, the viscosity at room temperature being too high to be conveniently measured. The gelling time depends, on, for example, the compatibility between the polymeric material and acrylate or methacrylate monomer, oligomer, or prepolymer, and on the particle size (that is to say surface area) of the polymeric material, and can vary from a few minutes to several hours. The resulting material is a flexible sheet that in its uncured state has form-stability, that is to say, will retain its configuration over a substantially indefinite length of time. The material is chosen such that the time it needs to gel is sufficient for the initially flowable liquid to adopt a smooth upper surface, the lower surface of the sheet being smoothed by conformity with the bottom of the tray-mould. For those polymeric materials that gel in the shorter times, say two or three minutes, another manufacturing process, for example employing a twin screw extruder, is preferable.

Such a process is simpler, provides better mixing of the constituents, and results in a faster gelling time.

The uncured, gel-like material advantageously is stretchable, and preferably elastic, for ensuring proper encapsulation of the component. On curing, the material should adhere to the electrical component, especially metals such as copper or aluminium used for electrical bus bars, and also to common electrical insulating material such as cross-linked polyethylene and cast resin material.

On curing, within a time period of a few minutes, the material becomes a thermoset, but advantageously retains some flexibility.

Padding material, for example a mastic, may be applied to the component underneath the curable material, for example to smooth out any large irregularities or to cover any sharp edges or corners, or to reduce the amount of curable material required. Where applicable, the padding material may enhance the electrical insulation provided by the cured material. Alternatively, the padding material may be electrically conductive, or have electrical stress-grading properties.

The mastic may be combined with the curable material such that a dual layer encapsulant is applied to the component as a single sheet.

In addition to, or instead of, the padding material, a layer of electrically insulating, conductive or stress-grading material may be provided, either separately or as a dual layer with the curable layer, to underlie the curable layer over the electrical component.

The sheet is preferably no thicker than about 6 mm to 10 mm, and advantageously is between about 1 mm and about 3 mm.

In many applications, it is desirable that the cured material be electrically insulating, for example having a resistivity of greater than $10^{10}$ ohm cm, and preferably around $10^{15}$ ohm cm. The insulation may be required for example to prevent flashover or arcing between closely-spaced electrical components at high voltage. The insulation may also be used in the design of electrical components to allow them to be located closer together than would be the case if they had less or no insulation.

The method of the invention is particularly, though not exclusively, suitable for encapsulating electrical components, such as electrical conductors, including bus bars, and connections therebetween, which require electrical insulation and/or water sealing.

The insulation of bus bar connections, for example, can be difficult to carry out, since usually two or three bus bars are disposed closely parallel to each other, and may also need to be encapsulated where they are located in the confined space of a transformer, or other, cabinet for example. It is, therefore, particularly advantageous to be able to insert a sheet of the curable material between two such bus bars, wrap it over one of the bars and then back on to itself, press it into shape and direct ultra-violet radiation on to it to complete the encapsulation. Furthermore, bolts used at bus bar connections give an irregular configuration, and preferably are smoothed out using an electrically conductive or insulating mastic.

Encapsulation by the present invention can also be conveniently effected on lengths of electrical conductor, particularly when of rectilinear cross-section, not only when the conductor extends unidirectionally, but also where it undergoes a sharp bend, such as one or two 90° bends at an L- or Z- bend respectively. In the latter instances, the high degree of conformity that is possible using the present method is particularly advantageous, where otherwise difficulty could be obtained, with recoveable tubing and also with conventional tape for example, in sealing completely into the sharp angle of the bend.

Another application where the present invention is advantageously applicable, is in the encapsulation, to provide electrical insulation, of band joints between two pieces of switchgear.

In some instances for encapsulation, it may be desirable to enclose the UV-curable material within a further member, for example to provide some or additional electrical or mechanical protection for the electrical component, or other substrate. Such member may be a tubing, of complete sleeve or wraparound configuration, and may be open at both ends, or only at one end so as to form an end cap. Alternatively, the member may be a tape, where application of a tape is practicable. Furthermore, such enclosing member may be recoverable, for example by the application of heat thereto, where this is practicable. Where such an enclosing member is employed, it will be appreciated that characteristics such as electrical insulation, non-trackability, and mechanical impact resistance may be requirements of such a member either in addition to or as an alternative to being a requirement of the UV curable material. Thus, the UV curable material may act only as a sealant, for example against water, whilst electrical protection is provided by the enclosing member.

In one encapsulating method in accordance with the present invention, and using an enclosing member as described above, the electrical component is encapsulated by the UV curable material, the material is cured by the application of UV radiation thereto, and the enclosing member is subsequently applied over the cured material, by means of the application of heat to effect recovery thereof if appropriate. However, it is also envisaged that the enclosing member may be selected to be of a material that is generally transparent to the UV wavelength used for curing the UV curable material, so that curing of the material may be arranged to take place after the enclosing member has been installed therearound. In the latter embodiment, the UV curable material may be provided as an inner layer of, for example secured internally to, the enclosing member.

The combination of an inner UV curable layer and an outer enclosing member, for example formed as a dual extrusion tubular article, provides a convenient encapsulating article with very good latent cure properties. Latent curing articles have to satisfy two criteria, namely they must be stable over a long time under storage conditions, and they must subsequently be able to be installed with a relatively short installation period. With thermally activated latent cure systems, these criteria tend to be in conflict with each other, requiring careful selection of the constituents. Furthermore, such systems function better the thinner the thermally-curable layer, in order to ensure complete curing throughout the bulk of the material; this being particularly so, when the thermally curable material is provided as a coating on the inside of a heat recoverable member, the heat of recovery being depended upon to effect curing of the inner layer. Such problems are avoided by the use of material that is curable by UV radiation. The viscosity of the UV curable material described above, is such that only a very small amount of heat is needed to provide sufficient flow of the material to distribute it within the enclosing member and around the electrical component, or other substrate.

A suitable UV transparent, heat-shrinkable enclosing member is material as sold by Raychem as its RNF Type 2 tubing.

This tubing does not absorb a significant amount of UV radiation, so that the curing time of the underlying material is substantially the same as if the tubing were not present.

In this embodiment of the invention, conformity of the curable material where this material is provided separate from the enclosing member, to the underlying component may still be effected manually, and such conformity may be enhanced by the subsequent application of a recoverable enclosing member. Alternatively, the conformity may be obtained substantially entirely, apart, where appropriate, for an initial wrapping, by recovery of said member.

A recoverable article is an article the dimensional configuration of which may be made to change appreciably when subjected to the appropriate treatment. The article may be heat-recoverable such that the dimensional configuration may be made to change when subjected to a heat treatment. Usually these articles recover, on heating, towards an original shape from which they have previously been deformed but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

The polymeric material may be cross-linked at any stage in its production that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Pat. No. 1,440,524, an elastomeric member such as an outer tubular member is held in a stretched state by a second member, such as an inner tubular member, which, upon heating weakens and thus allows the elastomeric member to recover.

Thus, by using the method of the present invention, not only may regularly-shaped electrical components be insulated, but irregularly-shaped electrical components may be encapsulated that would be impossible, or at least very difficult to insulate using known methods. Furthermore, since heating is not necessary, materials can be used that will withstand high temperatures, such as the 90° C. continuous operating temperature of some bus bars for example, which conventional mastics will not do.

In accordance with another aspect of the present invention, there is provided an article comprising an inner member of UV curable material, and a recoverable outer member. The inner member may be retained on the inside of the outer member. Each member may be formed by extrusion, and the complete article may be a co-extrusion. The inner member is preferably in accordance with said one aspect of the invention.

In a further aspect, there is provided an electrical component encapsulated by an article in accordance with said another aspect of the invention.

For the purpose of the present invention, radiation is considered to be ultra-violet if its wavelength lies within the range from about 250 nanometers to about 450 nanometers, and is preferably in the range between 320 nanometers and 400 nanometers. It will be appreciated that such radiation is harmless to human skin and eyes, in comparison with radiation of a slightly lower wavelength.

The ultra-violet radiation may be provided by a lamp having output of the desired wavelength, or it may simply be obtained from sunlight.

BRIEF DESCRIPTION OF THE DRAWINGS

Some embodiments of a method of encapsulating an electrical component, each in accordance with the present invention, will now be described, with reference to the accompanying drawing, in which.

DESCRIPTION OF PREFERRED EMBODIMENTS

Figure 1:
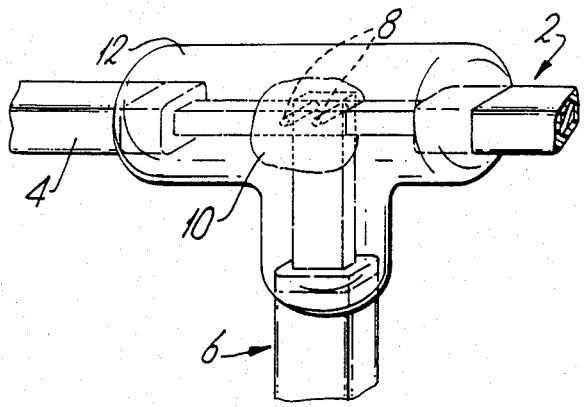
FIG. 1 shows an encapsulated T-shaped connection of a bus bar.

Referring to FIG. 1, a horizontal copper bus bar 2 of rectangular configuration measuring 6 cm×1 cm has part of its polymeric insulation 4 removed to allow connection thereto of a further section of bar 6 in a T-configuration. Insulation is stripped from the end of the bar 6 and the bars 2 and 6 are bolted together by two bolts 8.

The portions of the bars 2 and 6 in the region of the bolted connection therebetween now have to be encapsulated within electrically insulating material, for example to prevent damage caused by a metal tool or other conductive object forming a bridging path between the exposed bus bar portions and a region at a significantly different potential, or for safety reasons if the bars 2 and 6 are at a high potential. An insulating mastic 10 of putty-like consistency is firstly disposed around the sharp edges and projections around the bolts 8 to give this region a smooth profile.

An electrically insulating composition comprising 64 parts by weight of Plexigum P.24, a polybutylmethacrylate-methylmethacrylate powdered copolymer, 24 parts by weight of Chemlink 2000, a bifunctional long chain acrylate oligomer, 11 parts by weight of Photomer 3005, an acrylated epoxidised soybean oil plasticiser, and 1 part by weight of the photoinitiator Darocur 953, was mixed under vacuum to dissolve the copolymer in the oligomer. The composition was left in the mixer for between three and four hours, until its viscosity became high enough for it to be suitable for loading into a single screw extruder. The die of the extruder was arranged to provide an output sheet of the desired width and thickness. The resultant sheet was a form-stable, transparent, elastically stretchable gel having a slightly tacky surface.

The material is cut into a rectangular sheet 12 that is arranged to be large enough to be wrapped in a U-shape over the bus bar 2 so as to extend over the mastic 10 and on to the insulation 4 at each side of the bolts 8, and down over the insulation of the bus bar 6 to enclose the uninsulated portion thereof. The sheet 12 is then pressed by hand into conformity with the components therebeneath, so as to exclude air from around the bus bars 2 and 6 and the mastic 8, and to seal on to the bus bar insulation, and to itself.

The flexibility of the sheet material 12 and the mastic 8 is such that the encapsulant can be urged completely into the sharp angle between the bus bars 2 and 6.

The output from a 200 W ultra-violet lamp, having its peak intensity within the range 320 nanometers to 400 nanometers and delivering a radiation dose of about 1 $j/cm^2$, is then directed substantially evenly on to the sheet 12 for a period of 4 minutes to cure the sheet material. This causes the sheet 12 to become a tough thermoset, hardening whilst still being slightly flexible. Its outer surface becomes less tacky.

Since the material is optically transparent, its conformity to its component prior to curing is easily observable, thus ensuring that no air bubbles need remain trapped therein.

Figure 2:
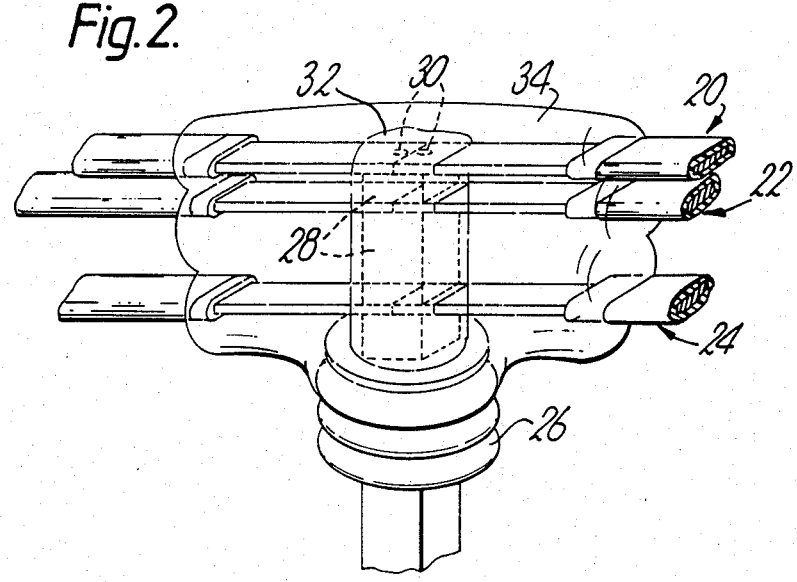
FIG. 2 shows an encapsulated connection between three tier bus bars.

FIG. 2 shows a bus bar arrangement in which three bus bars 20, 22 and 24 at the same electrical potential extend closely-spaced parallel with one another and are connected together at a support 26. The uninsulated copper conducters of the arrangement each measure 6 cm×1 cm, and bus bars 20 and 22 are spaced apart by 1 cm, whilst bus bars 22 and 24 are spaced apart by 3 cm. Electrically conductive blocks 28 space the bus bars apart, and bolts 30 pass down through the blocks 28 and the bus bars, to secure the arrangement together and to the convoluted insulating resin body portion of the support 26.

An electrically insulating mastic 32, as used in the embodiment of FIG. 1, is disposed over the projecting heads of the bolts 30, around the sharp edges of the blocks 28 and on to the upper part of the support 26. A sheet 34 of the same curable material as the sheet 12 of the embodiment of FIG. 1, is draped over the bus bar arrangement, to extend completely over the uninsulated portions of the three bus bars and on to the insulated portions thereof, and down over the insulating support 26. The sheet 34 is then made to conform to the bus bar insulation, the exposed conductor portions, the mastic 32 and the support 26, being urged into the confined regions between the uninsulated conductors around the blocks 28, so as to exclude air as far as practicable. Ultra-violet radiation is then directed on to the sheet 34 to effect curing thereof, using a reflector if necessary to obtain access to the whole surface of the sheet.

Figure 3:
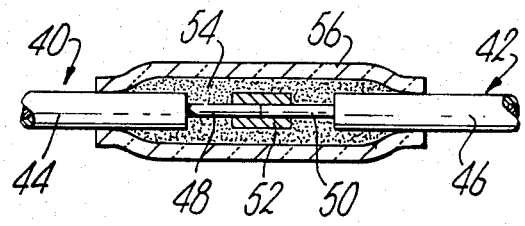
FIG. 3 shows a section through a splice between two conductors.

Referring to FIG. 3, two single core electric cables 40, 42 have the insulation 44, 46 thereof cut back to expose respective conductors 48, 50. The conductors 48, 50 are connected together by a metal crimp 52. A sheet 54 of UV curable material as described with reference to FIG. 1 is wrapped around the cable splice region so as to extend from the insulation 44 of cable 40, over its conductor 48, over the crimp 52, and over the conductor 50 and adjacent insulation 46 of the cable 42. A UV-transparent, heat-shrinkable tube 56, as sold by Raychem under the name RNF 100 Type 2, is located around the splice region, previously having been slid to one side over one of the conductors 40, 42, and centralised on the crimped 52, the tube being long enough to extend at each end at least so far as to enclose the curable material 54. Heat is applied to the tube 56 to cause is to shrink to enclose the splice region. The heat also causes the curable material 54 to become less viscous, and under the shrinking action of the tubular sleeve 56 conforms with the underlying cables and crimp. Finally, UV radiation is directed through the tube 56 on to the material 54 to effect its curing.

It will be appreciated that the single wrap of the curable sheet is a very convenient way of encapsulating a substrate, and can be used even in a confined space, where access is not available for more elaborate wrapping particularly of more complex substrate configurations, as shown in FIG. 2 for example. Furthermore, it will be appreciated that the method of the present invention allows substrates of complex configurations, even when accessible, to be encapsulated in a particularly convenient manner.

We claim:
1. A method of encapsulating an electrical component comprising:
   (a) manually wrapping around said component a form stable sheet comprising a material that is curable by ultra-violet radiation, said material comprising a polymer, at least one bifunctional monomer, oligomer or prepolymer and a photoinitiator;
   (b) manually deforming said sheet into conformity with said component; and
   (c) then, after said sheet has been brought into substantial conformity with the component, subjecting the sheet to ultra-violet radiation to effect substantially complete cure of said material.

2. A method according to claim 1, wherein an outer recoverable member is disposed around the curable material, wherein said member is recovered onto the curable material and effects conformity thereof with the electrical component.

3. A method according to claim 2, wherein said outer member is heat recoverable, and wherein heat is applied thereto to effect its recovery.

4. A method according to claim 2, wherein said outer member is substantially transparent to the ultra-violet radiation, and wherein the ultra-violet radiation is directed on to the curable material through the outer member.

5. A method according to claim 1, wherein a further layer is applied to the component so as to underlie the curable material, said further layer being electrically conductive, insulating or stress-grading.

6. A method according to claim 1, wherein the curable material when cured is electrically insulating material, and is disposed around the electrical component so as to insulate said component.

7. A method according to claim 1, which further comprises the steps of disposing an outer member around the curable material and arranged to enclose said material, and retaining said outer member around the curable material after it has been cured.

8. A method according to claim 1, wherein said sheet comprises an inner layer comprising said material and an outer member, and said sheet is wrapped around said component with the inner layer facing said component.

9. A method according to claim 1, wherein a single wrap of said sheet is applied to said electrical component.

10. A method according to claim 1, wherein the electrical component has a complex configuration.

* * * * *